(12) United States Patent
Aizaki

(10) Patent No.: US 10,025,172 B2
(45) Date of Patent: Jul. 17, 2018

(54) LIGHT SOURCE DEVICE AND IMAGE PROJECTION APPARATUS

(71) Applicant: JVC KENWOOD Corporation, Yokohama-shi, Kanagawa (JP)

(72) Inventor: Takatsugu Aizaki, Yokohama (JP)

(73) Assignee: JVC KENWOOD CORPORATION, Yokohama-shi (JP)

(*) Notice: Subject to any disclaimer, the term of this patent is extended or adjusted under 35 U.S.C. 154(b) by 0 days.

(21) Appl. No.: 15/221,691

(22) Filed: Jul. 28, 2016

(65) Prior Publication Data

US 2017/0090274 A1  Mar. 30, 2017

(30) Foreign Application Priority Data

Sep. 29, 2015 (JP) .................. 2015-191596

(51) Int. Cl.
*G03B 21/20* (2006.01)
*H04N 9/31* (2006.01)
*G02B 27/14* (2006.01)

(52) U.S. Cl.
CPC .......... *G03B 21/208* (2013.01); *G02B 27/14* (2013.01); *G03B 21/2013* (2013.01); *G03B 21/2033* (2013.01); *G03B 21/2066* (2013.01)

(58) Field of Classification Search
CPC ............ G03B 21/2053; G03B 21/2066; G03B 21/208; G03B 21/2013; G03B 21/2033; H04N 9/3152; H04N 9/3155; H04N 9/3161; H04N 9/3164; G02B 27/14; G02B 27/144; G02B 27/145
USPC .......................................... 353/94
See application file for complete search history.

(56) References Cited

U.S. PATENT DOCUMENTS

2004/0257664 A1* 12/2004 Hashimoto ........ G02B 27/1033
                                                            359/636
2016/0223895 A1*  8/2016 Okuda ............... G03B 21/2033

FOREIGN PATENT DOCUMENTS

JP        2015-087525        5/2015

* cited by examiner

*Primary Examiner* — Ryan Howard
(74) *Attorney, Agent, or Firm* — Amin, Turocy & Watson LLP

(57) ABSTRACT

A light source device includes: a light source including a laser; a dispersing member disposed on a path of a laser beam emitted by the laser, and configured to disperse the laser beam into a plurality of dispersed beams with peak intensities lower than a peak intensity of the laser beam to emit the dispersed beams; and an optical component disposed on paths of the dispersed beams.

12 Claims, 7 Drawing Sheets

LIGHT SOURCE DEVICE AND IMAGE PROJECTION APPARATUS

CROSS-REFERENCE TO RELATED APPLICATION(S)

The present application claims priority to and incorporates by reference the entire contents of Japanese Patent Application No. 2015-191596 filed in Japan on Sep. 29, 2015.

BACKGROUND

1. Field

The present disclosure relates to a light source device and an image projection apparatus.

2. Description of the Related Art

In a light source device having lasers, contaminants in the air are adhered to optical components such as lenses on which laser beams emitted by the lasers are incident because of high energy density of the laser beams. In this phenomenon, when short-wavelength lasers of particularly high energy are used, a photochemical reaction with gas in the air such as siloxane and sulfur dioxide occurs to make adhesion of contaminants to optical components more significant. Adhesion of contaminants to lenses and the like causes problems such as a decrease in output power of light emitted by the lenses. Technologies for removing contaminants adhering to optical components have thus been disclosed.

For example, Japanese Patent Application Laid-open No. 2015-087525 discloses a light source device that captures contaminants with use of electrodes and sucks to discharge the contaminants with use of a fan.

With the technology mentioned above, however, such components as the electrodes, a power supply to apply voltage to the electrodes, and the fan are required, which disadvantageously increases the size of the light source device.

SUMMARY

It is an object of the present disclosure to at least partially solve the problems in the conventional technology.

According to the present disclosure, there is provided a light source device comprising: a light source including at least one laser; a dispersing member disposed on a path of a laser beam emitted by the laser, and configured to disperse the laser beam into a plurality of dispersed beams with peak intensities lower than a peak intensity of the laser beam to emit the dispersed beams; and an optical component disposed on paths of the dispersed beams.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Figure 1:
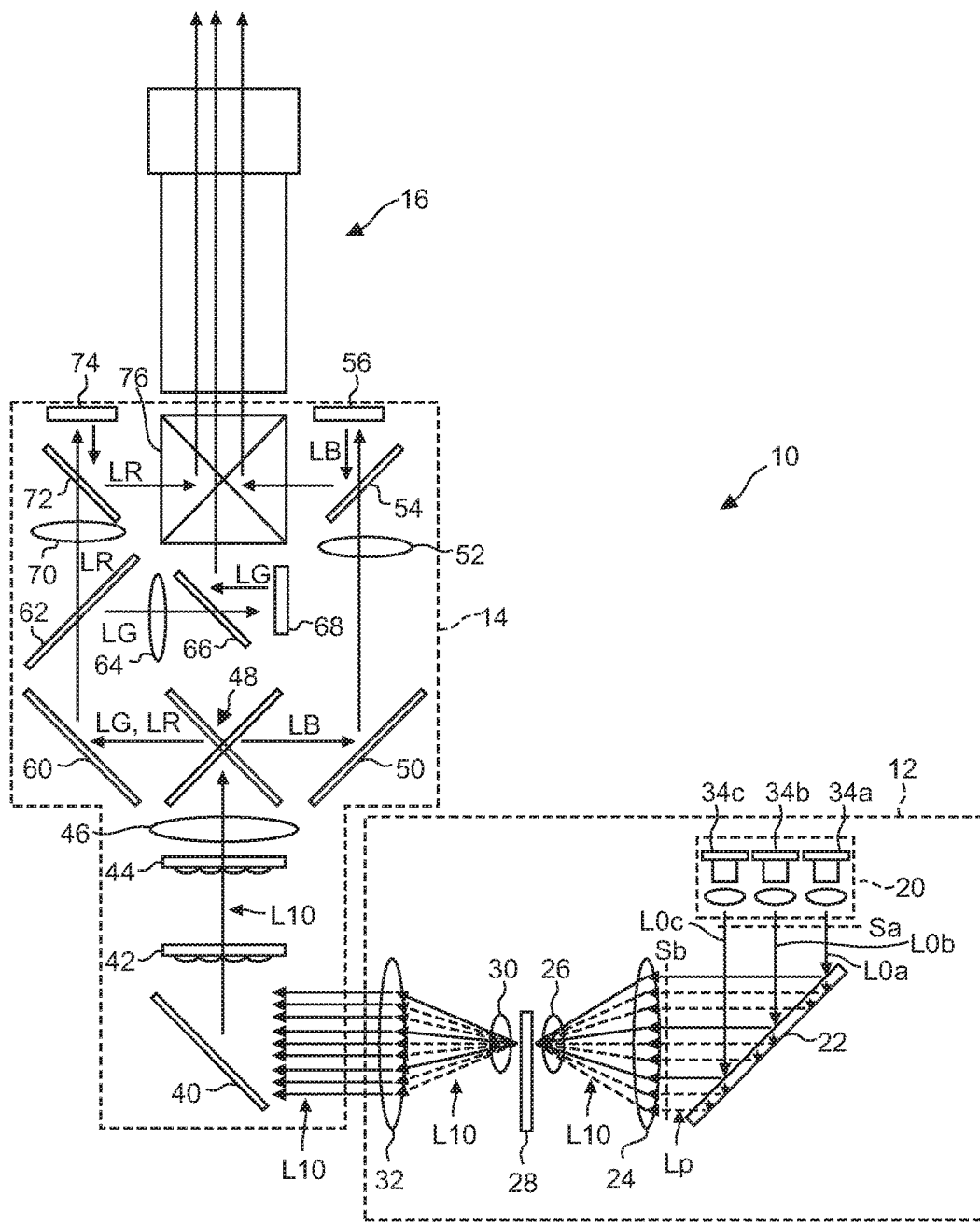
FIG. 1 is an overall configuration diagram of an image projection apparatus including a light source device according to a first embodiment.

In exemplary embodiments and modified examples presented below, same or similar components are included. Thus, in the description below, the same or similar components will be designated by the same reference numerals and redundant explanation may partially omitted. Some parts included in an embodiment or a modified example may be replaced with corresponding parts in other embodiments or modified examples. In addition, the structures and the positions of parts included in an embodiment or a modified example are the same as those in other embodiments and modified examples unless otherwise mentioned.

First Embodiment

FIG. 1 is an overall configuration diagram of an image projection apparatus 10 including a light source device 12 according to a first embodiment. The image projection apparatus 10 generates an image and projects the image in an enlarged manner onto a screen or the like. As illustrated in FIG. 1, the image projection apparatus 10 includes the light source device 12, an image generation unit 14, and a projection unit 16.

The light source device 12 emits light for image generation to the image generation unit 14. The light source device 12 is disposed at the most upstream position on the path of light forming an image. The light source device 12 includes a light source 20, a dispersing member 22, a condenser lens 24, a lens 26, rotary diffuser 28, a lens 30, and a lens 32.

The light source 20 includes three lasers 34a, 34b, and 34c. The lasers 34a, 34b, and 34c will be designated by a reference numeral 34 unless the lasers 34a, 34b, and 34c need to be distinguished from one another. The three lasers 34 are arranged in an array, for example. In the present embodiment, the three lasers 34 are arranged in line. The direction in which the lasers 34 are arranged will be referred to as an array direction. The three lasers 34 are arranged at regular intervals, for example. The lasers 34 have a power-to-light conversion efficiency of 20 to 30%, and energy that is not converted to light is converted to heat and causes high temperature. Thus, lasers 34 are preferably spaced from each other in view of cooling. If, however, the lasers 34 are spaced too far from each other, this results in a larger size of the light source device 12. Thus, the lasers 34 are preferably not spaced from each other in view of reduction in size. For example, when the optical output power of the lasers 34 is about 4 W, the interval between the lasers 34 is preferably about 10 mm. The three lasers 34a, 34b, and 34c emit laser beams L0a, L0b, and L0c, respectively. The laser beams emitted by the lasers 34 will be designated by a reference numeral L0 unless the laser beams need to be distinguished from one another. The direction in which the laser beams L0 travel will be referred to as a traveling direction. The array direction of the lasers 34 and the traveling direction of the laser beams L0 intersect with each other (at right angles, for example).

The dispersing member 22 is disposed on the paths of the laser beams L0 emitted by the lasers 34 of the light source 20. Note that peak positions of the laser beams L0 emitted by the lasers 34 arranged in an array do not overlap with one another on the surface of the dispersing member 22. The dispersing member 22 is a plate-like member. The dispersing member 22 is tilted with respect to the paths of the laser beams L0. The dispersing member 22 disperses each of the laser beams L0 into multiple dispersed beams Lp (p=1, 2, . . . ) having peak intensities lower than those of the laser beams L0 to emit the dispersed beams. The dispersed beams Lp travel parallel to one another.

The condenser lens 24 is disposed on the paths of the dispersed beams Lp which are dispersed by the dispersing member 22. The condenser lens 24 collects the dispersed beams Lp and emits the collected dispersed beams Lp to the rotary diffuser 28 via the lens 26. The condenser lens 24 is an example of an optical component.

The rotary diffuser 28 is disposed on the paths of the beams L10 collected by the lens 26 and near the focus of the lens 26. The rotary diffuser 28 diffuses the beams L10, which have locally uneven intensities because of originating from the laser beams L0, so that the beams L10 become substantially uniform on a plane perpendicular to the traveling direction of the beams L10 to emit the diffused beams. Note that the rotary diffuser 28 rotates about a rotation axis parallel to the paths of the beams L10. In this manner, the rotary diffuser 28 reduces the unevenness of the intensities of the beams L10 due to a pattern or the like formed thereon by temporally changing the intensity unevenness by rotation.

The lens 30 is disposed on the paths of the beams L10 emitted by the rotary diffuser 28. The lens 30 diverges and emits the beams L10.

The lens 32 converts the beams L10 radiated by the lens 30 to beams L10 travelling parallel to one another, and emits the parallel beams L10 to the image generation unit 14.

The image generation unit 14 splits the beams L10 emitted by the light source device 12 into beams of three colors (for example, blue beams LB, green beams LG, and red beams LR), and generates an image from the beams. The image generation unit 14 includes a mirror 40, a pair of fly-eye lenses 42 and 44, a lens 46, and a beam splitter 48.

The mirror 40 is disposed on the paths of the parallel beams L10 emitted by the lens 32 of the light source device 12. The mirror 40 reflects the incident beams L10 toward the fly-eye lenses 42 and 44.

The fly-eye lenses 42 and 44 disperses the beams L10 so that the intensities become uniform on a plane perpendicular to the traveling direction of the beams L10, and emits the beams L10 to the beam splitter 48 via the lens 46.

The beam splitter 48 splits the incident beams L10 based on the wavelengths of the beams L10. For example, the beam splitter 48 includes a first dichroic mirror, which reflects the beams LB in a blue wavelength range and transmits the beams LR and LG in red and green wavelength ranges, and a second dichroic mirror, which reflects the beams LR and LG in the red and green wavelength ranges and transmits the beams LB in the blue wavelength range. With this configuration, the beam splitter 48 splits the beams into the blue beam LB having relatively short wavelengths and the red and green beams LR and LG having wavelengths longer than those of the blue beam, and emits the split beams.

The image generation unit 14 further includes a mirror 50, a lens 52, a polarizing beam splitter 54, and an optical modulator 56.

The blue beam LB split by the beam splitter 48 is incident on the mirror 50. The mirror 50 emits the blue beam LB to the polarizing beam splitter 54 via the lens 52.

The polarizing beam splitter 54 transmits or reflects the incident blue beam LB depending on the direction of beam oscillation. For example, the polarizing beam splitter 54 transmits S-polarized beam and reflects P-polarized beam. Thus, the polarizing beam splitter 54 transmits S-polarized beam of the incident blue beam LB and emits the transmitted beam to the optical modulator 56.

The optical modulator 56 is a reflective liquid crystal device, for example. The optical modulator 56 rotates the oscillation direction of the incident polarized beam by 90 degrees. The optical modulator 56 reflects part of beam and blocks the remaining part of the beam. Note that the optical modulator 56 may be a digital mirror device (DMD). The optical modulator 56 acquires an image signal for generating a blue image. The optical modulator 56 converts part of incident S-polarized beam in blue into P-polarized beam and reflects the P-polarized beam on the basis of the image signal. In this manner, the optical modulator 56 generates an image with the blue beam LB. The optical modulator 56 emits the reflected beam to the polarizing beam splitter 54.

As described above, since the polarizing beam splitter 54 reflects P-polarized beam, the polarizing beam splitter 54 reflects the blue beam LB that have been converted into P-polarized beam by the optical modulator 56 to form an image toward a beam combiner 76, which will be described below.

The image generation unit 14 further includes a mirror 60, a color splitter 62, a lens 64, a polarizing beam splitter 66, an optical modulator 68, a lens 70, a polarizing beam splitter 72, an optical modulator 74, and the beam combiner 76.

The red and green beams LR and LG among the split beams from the beam splitter 48 are incident on the mirror 60. The mirror 60 emits the incident beams LR and LG to the color splitter 62.

The color splitter 62 splits the beams by reflecting part of beams while transmitting the remaining part of the beams depending on the wavelengths. The color splitter 62 is a dichroic mirror, for example. The color splitter 62 reflects the green beam LG having short wavelengths among the incident red and green beams LR and LG toward the polarizing beam splitter 66 via the lens 64. The color splitter 62 transmits the red beam LR having long wavelength among the incident red and green beams LR and LG and emits the transmitted red beam LR to the polarizing beam splitter 72 via the lens 70.

The polarizing beam splitter 66 transmits or reflects the incident green beam LG depending on the direction of beam oscillation. For example, the polarizing beam splitter 66 transmits P-polarized beam and reflects S-polarized beam. Thus, the polarizing beam splitter 66 transmits P-polarized beam of the incident green beam LG and emits the transmitted beam to the optical modulator 68.

The optical modulator 68 is a reflective liquid crystal device, for example. The optical modulator 68 rotates the oscillation direction of the incident polarized beam by 90 degrees, and reflects part of the beam LG while blocking the remaining part of the beam LG. The optical modulator 68 acquires an image signal for generating a green image. The optical modulator 68 converts part of incident P-polarized beam in green into S-polarized beam and reflects the S-polarized beam on the basis of the image signal. In this manner, the optical modulator 68 generates an image with the green beam LG. The optical modulator 68 emits the reflected beam to the polarizing beam splitter 66.

As described above, since the polarizing beam splitter 66 reflects S-polarized beam, the polarizing beam splitter 66 reflects the green beam LG that have been converted into S-polarized beam by the optical modulator 68 to form an image toward the beam combiner 76.

The polarizing beam splitter 72 transmits or reflects the incident red beam LR depending on the direction of beam oscillation. For example, the polarizing beam splitter 72 transmits S-polarized beam and reflects P-polarized beam. Thus, the polarizing beam splitter 72 transmits S-polarized beam of the incident red beam LR and emits the transmitted beam to the optical modulator 74.

The optical modulator 74 is a reflective liquid crystal device, for example. The optical modulator 74 rotates the oscillation direction of the incident polarized beam by 90 degrees, and reflects part of the beam LR while blocking the remaining part of the beam LR. The optical modulator 74 acquires an image signal for generating a red image. The optical modulator 74 converts part of incident S-polarized red beam into P-polarized beam and reflects the P-polarized beam on the basis of the image signal. In this manner, the optical modulator 74 generates an image with the red beam LR. The optical modulator 74 emits the reflected beam to the polarizing beam splitter 72.

As described above, since the polarizing beam splitter 72 reflects P-polarized beam, the polarizing beam splitter 72 reflects the red beam LR that have been converted into P-polarized beam by the optical modulator 74 to form an image toward the beam combiner 76.

The beam combiner 76 combines the images formed by the respective blue, green, and red beams and outputs a combined image. The beam combiner 76 reflects or transmits the beams LB, LG, and LR depending on the oscillation direction of the beams. The beam combiner 76 is a polarizing beam splitter, for example. Here, the beam combiner 76 reflects P-polarized beam and transmits S-polarized beam. The P-polarized blue beam LB reflected by the polarizing beam splitter 54 to form an image, the S-polarized green beam LG reflected by the polarizing beam splitter 66 to form an image, and the P-polarized red beam LR reflected by the polarizing beam splitter 72 to form an image are incident on the beam combiner 76. The beam combiner 76 reflects the blue and red beams LB and LR, which are P-polarized beams and outputs the reflected beams to the projection unit 16, while transmitting the green beam LG, which is S-polarized beam, and outputting the transmitted beam to the projection unit 16. In this manner, the beam combiner 76 combines the images of the blue, green, and red beams to generate a color image.

The beams LB, LG, and LR generated by the image generation unit 14 to form the image enter the projection unit 16. The projection unit 16 enlarges and projects the beams LB, LG, and LR forming the image onto a screen or the like, for example.

Figure 2:
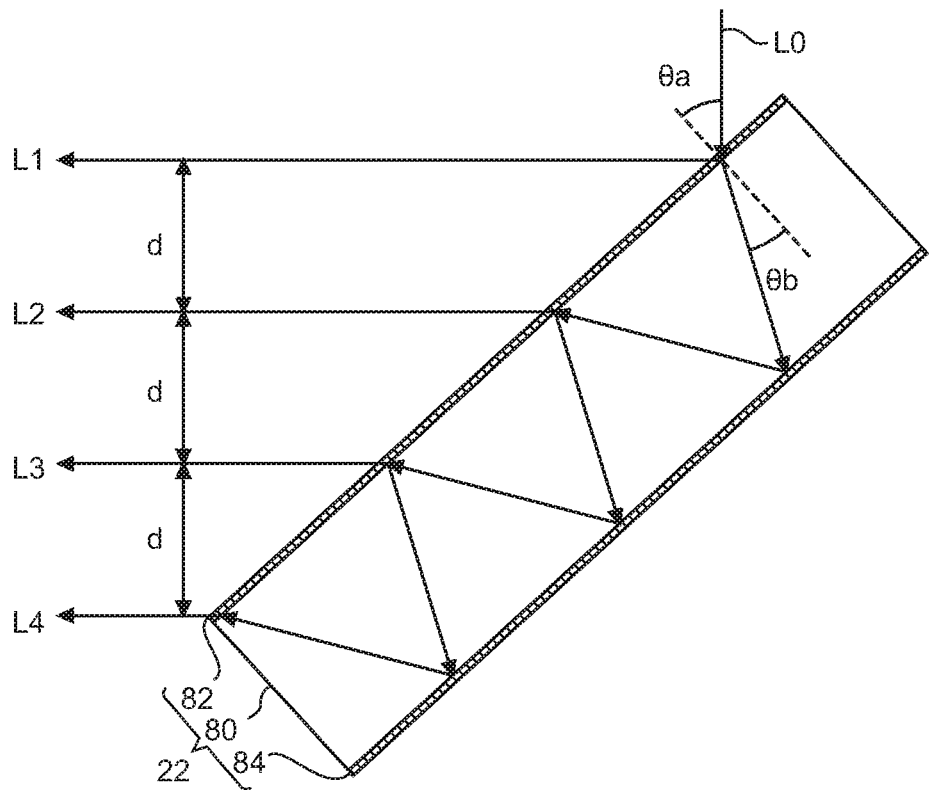
FIG. 2 is an enlarged view for explaining dispersion of laser beams by a dispersing member.

FIG. 2 is an enlarged view for explaining dispersion of the laser beams L0 by the dispersing member 22. As illustrated in FIG. 2, the dispersing member 22 includes a support 80, a first reflective film 82, and a second reflective film 84.

The support 80 is made of a light transmissive material. The support 80 has a plate-like shape. The support 80 has a front face, on which the laser beams L0 are incident, and a back face opposite to the front face. The front face and the back face of the support 80 are parallel to each other. The support 80 is a glass plate, for example. The support 80 is disposed in a tilted state with respect to the traveling direction of the incident laser beams L0. The support 80 is tilted 45 degrees with respect to the traveling direction of the laser beams L0, for example. The support 80 is tilted with respect to the array direction of the three lasers 34. The support 80 is tilted 45 degrees with respect to the array direction of the three lasers 34.

The first reflective film 82 is provided on the front face of the support 80 on which the laser beams L0 are incident. A plane including the first reflective film 82 (for example, a plane parallel to the front face of the support 80) is tilted with respect to the traveling direction of the laser beams L0 and the array direction of the three lasers 34. Peaks of the laser beams L0 reaching the first reflective film 82 are not superimposed on one another. The first reflective film 82 is a reflective film that transmits part of the incident laser beams L0. The first reflective film 82 is composed of a dichroic mirror, for example. The first reflective film 82 may be a metal film that functions as a one-way mirror. Here, the reflectance of the first reflective film 82 is represented by $R_1$ and the transmittance thereof is represented by $T_1$.

The second reflective film 84 is provided on the back face of the dispersing member 22. Thus, the second reflective film 84 is positioned with a space from the first reflective film 82. The first reflective film 82 and the second reflective film 84 are provided parallel to each other. The space between the first reflective film 82 and the second reflective film 84 corresponds to the thickness of the support 80. A plane including the second reflective film 84 (for example, a plane parallel to the back face of the support 80) is tilted with respect to the traveling direction of the laser beams L0 and the array direction of the three lasers 34. The reflectance of the second reflective film 84 is represented by $R_2$ and the transmittance thereof is represented by $T_2$. The transmittance $T_2$ of the second reflective film 84 is lower than the transmittance $T_1$ of the first reflective film 82. For example, the second reflective film 84 is a total reflection film having a reflectance of 100%. The second reflective film 84 is composed of a metal film, a dichroic mirror, or the like having a high reflectance. The second reflective film 84 reflects the laser beams L0 transmitted through the first reflective film 82 and the laser beams L0 reflected by the back face of the first reflective film 82 to the first reflective film 82.

Next, functions of the dispersing member 22 will be described. Three laser beams L0 emitted by the three lasers 34 travel parallel to one another and reach the first reflective film 82 of the dispersing member 22. The first reflective film 82 reflects part of the laser beams L0 to the condenser lens 24 and transmits the remaining part. The light beams transmitted by the first reflective film 82 travel inside of the support 80 and reach the second reflective film 84. The second reflective film 84 reflects the light beams to the first reflective film 82. The first reflective film 82 transmits part of the light beams reflected by the second reflective film 84 and reflects the remaining part to the second reflective film 84. In this manner the first reflective film 82 and the second reflective film 84 repeats reflection of light beams traveling in the support 80 (that is, multiple reflections) while the first reflective film 82 transmits light beams little by little depending on the transmittance $T_1$, to emit the laser beams L0 in the form of dispersed beams Lp to the condenser lens 24. The dispersed beams Lp are light beams reflected p−1 times by the second reflective film 84 and then transmitted by first reflective film 82 to be emitted.

As described above, the first reflective film 82 and the second reflective film 84 are tilted with respect to the traveling direction of the laser beams L0 and the array direction of the three lasers 34. This allows the dispersed beams Lp to travel in a state arranged in line. In addition, the first reflective film 82 and the second reflective film 84 are provided parallel to each other. This allows multiple dispersed beams Lp dispersed from one laser beam L0 to travel at equal intervals in parallel to one another.

Here, the refractive index of the support 80 is represented by n. Specifically, the refractive index of a space where light beams travel between the first reflective film 82 and the second reflective film 84 is n. The thickness of the support 80 is represented by t. Specifically, the space between the first reflective film 82 and the second reflective film 84 in the normal direction is t. An incidence angle, which is an angle between the normal direction of the first reflective film 82 and an incidence direction is represented by θa. The incidence direction used herein is a direction in which the laser beams L0 incident on the first reflective film 82 have travelled. An emission angle, which is an angle between the normal direction of the first reflective film 82 and an emission direction is represented by θb. The emission direction used herein is a direction in which the beams transmitted by the first reflective film 82 travel.

In this case, the distance d between a dispersed beam Lp and a dispersed beam Lp+1 dispersed from the same laser beam L0 can be expressed by the following expression:

$$d = 2 \times t \times \sin(\theta a - \theta b)/\cos \theta b \qquad (1)$$

In addition, according to the Snell's law, the relation between the incidence angle θa and the emission angle θb can be expressed by the following expression (2):

$$\sin \theta a = n \times \sin \theta b \qquad (2)$$

The expression (2) is substituted into the expression (1) to obtain an expression (3):

$$d = 2 \times t \times \sin(\theta a - \sin^{-1}(\sin \theta a/n))/\cos(\sin^{-1}(\sin \theta a/n)) \qquad (3)$$

With the expression (3), the distance d can be set using the thickness t and the incidence angle θa. For example, when t=1.5 and θa=45°, d=1 is obtained. Furthermore, since the thickness t and the distance d are in proportional relationship, the distance d can be increased by increasing the thickness t.

Figure 3:
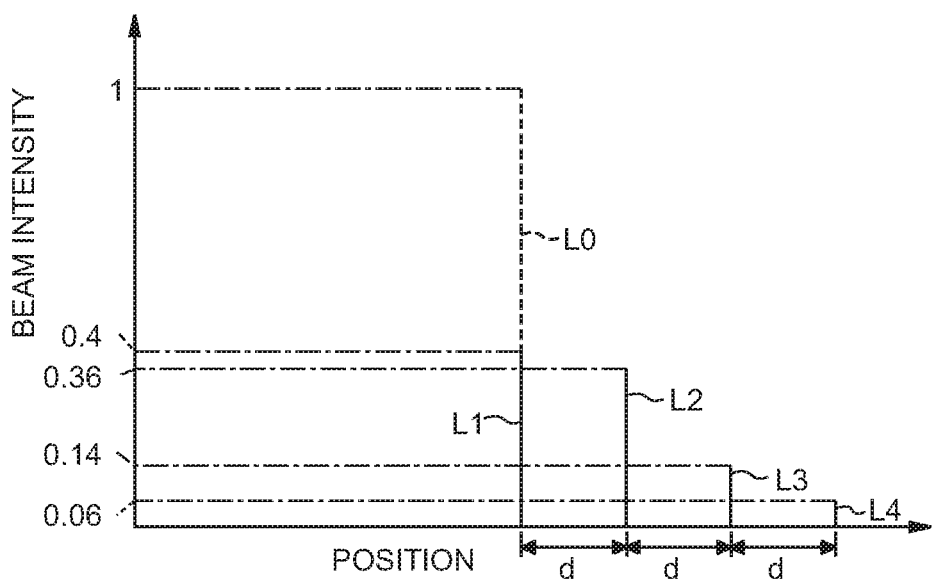
FIG. 3 is a graph for explaining intensities of dispersed beams.

FIG. 3 is a graph for explaining the intensities of the dispersed beams Lp. When p is 2 or larger, the intensities of the dispersed beams Lp are $T_1^2 R_2^{p-1} R_1^{p-2}$ with respect to the intensity of a laser beams L0. Thus, the intensities of dispersed beams L1, L2, L3, and L4 are $R_1$, $T_1^2 R_2$, $T_1^2 R_1 R_2^2$ and $T_1^2 R_1^2 R_2^3$ respectively. Here, assume that $R_1=0.4$, $T_1=0.6$, $R_2=1$, and $T_2=0$. When the intensity of an incident laser beam L0 is 1, the intensities of the dispersed beams L1, L2, L3, and L4 are 0.4, 0.36, 0.14, and 0.06, respectively. FIG. 3 is a graph showing these intensities. Note that the intensity of a laser beam L0 is an intensity at the position of a plane Sa while the intensities of the dispersed beams Lp are intensities at a plane Sb in FIG. 1.

Figure 4:
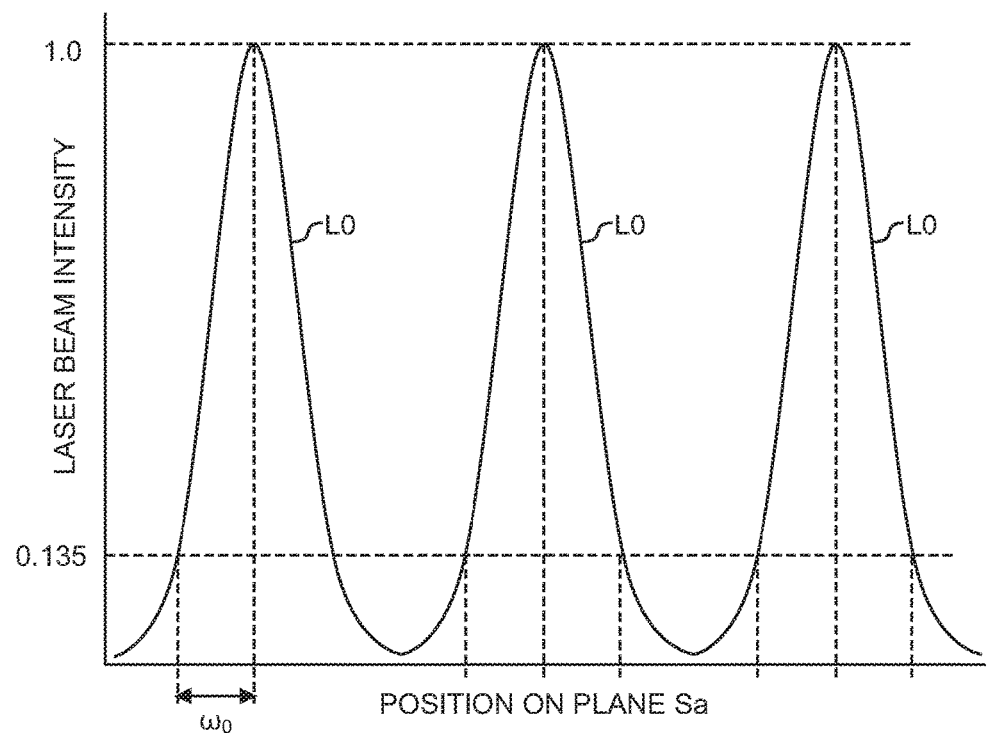
FIG. 4 is a graph of intensity distributions of laser beams having a Gaussian distribution.
Figure 5:
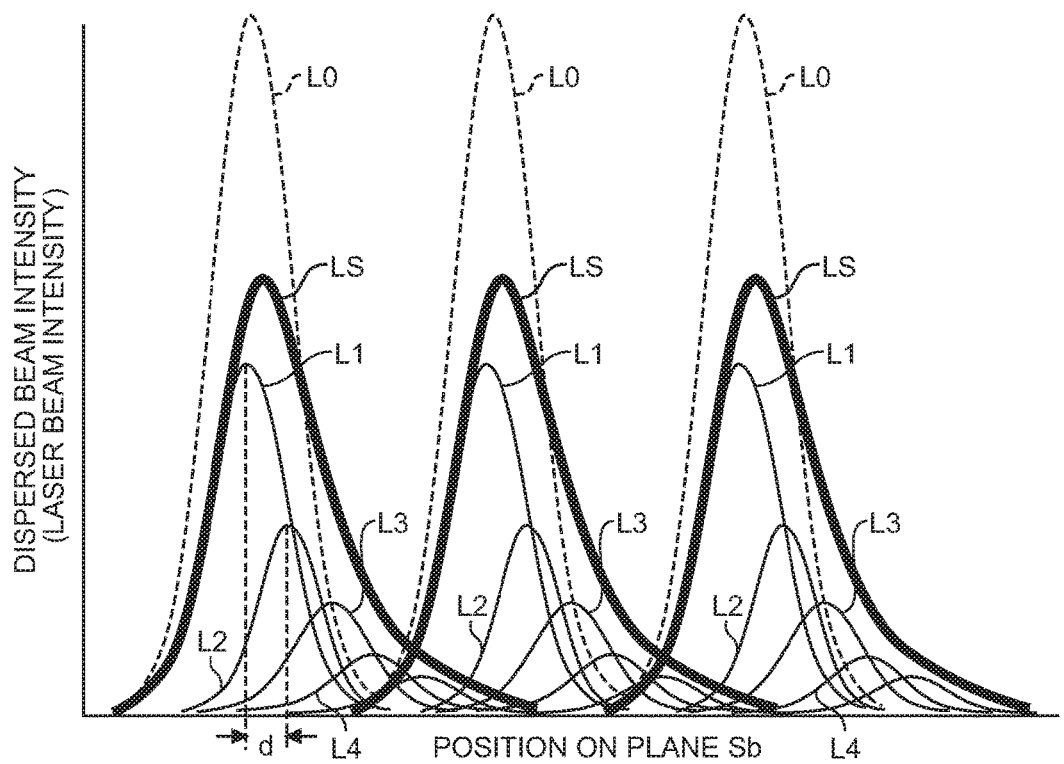
FIG. 5 is a graph of intensity distributions of dispersed beams obtained by dispersion of laser beams having a Gaussian distribution.

Next, a case in which the intensity distribution of a laser beam L0 has a distribution width will be described. FIG. 4 is a graph of the intensity distributions of the laser beams L0 having a Gaussian distribution. Note that FIG. 4 shows the intensity distributions at the plane Sa in FIG. 1. FIG. 5 is a graph of the intensity distributions of the dispersed beams Lp obtained by dispersion of laser beams having the Gaussian distribution. Note that FIG. 5 shows the intensity distributions of the laser beams L0 at the plane Sa superimposed on the intensity distributions of the dispersed beams at the plane Sb.

The above-described graph illustrated in FIG. 3 shows the intensities of the respective dispersed beams Lp only by lines of peaks. In fact, however, the intensity of the laser beam L0 has a distribution width in the horizontal axis direction as illustrated in FIG. 4. An example of an intensity distribution having a distribution width is a Gaussian distribution. The Gaussian distribution can be expressed by the following expression (4):

$$I = I_0 \exp(-2r^2/\omega_0^2) \qquad (4)$$

$I_0$ represents a peak intensity of a dispersed beam Lp. r represents a distance from a position of the peak intensity. $\omega_0$ is called a Gaussian beam radius. The Gaussian beam radius $\omega_0$ represents a radius at which the intensity has decreased to $1/e^2$ or 0.135 of the peak intensity.

When the intensity of the laser beam L0 has the Gaussian distribution, the intensity of each of the dispersed beams Lp also has a distribution width in the horizontal axis direction as illustrated in FIG. 5. Here, when the distance d is small, the intensity distribution of a dispersed beam Lp overlaps with the intensity distribution of a dispersed beam Lp adjacent thereto. An integrated intensity distribution LS obtained by integrating intensity distributions of dispersed beams Lp of one laser beam L0 shows a distribution represented by a thick curve in FIG. 5. Note that an integrated value obtained by integrating the peak intensity of a dispersed beam L1 and the peak intensity of a dispersed beam L2 is "$R_1+T_1^2 R_2$". Since $R_1$ is smaller than 1, the integrated value satisfies the following expression (5), where "$R_1+T_1=1$":

$$1 > R_1 + T_1^2 R_2 \qquad (5)$$

This indicates that the integrated value of the peak intensity of the dispersed beam L1 and the peak intensity of the dispersed beam L2 is smaller than the intensity of the laser beam L0. Since the integrated value of other dispersed beams Lp will obviously not larger than the integrated value of the dispersed beam L1 and the dispersed beam L2, an integrated value of any dispersed beam Lp and dispersed beam Lp+1 is smaller than the intensity of the laser beam L0.

As described above, in the image projection apparatus 10 and the light source device 12, the dispersing member 22 disperses each of the laser beams L0 into multiple dispersed beams Lp having peak intensities lower than that of the laser beam L0. Consequently, since the dispersed beams Lp with dispersed intensities, instead of the laser beam L0, are incident on the condenser lens 24 disposed on the emitting side of the dispersing member 22, concentration of high energy to optical components such as the condenser lens 24 is prevented. Furthermore, since the dispersing member 22 is also used as a member for changing the traveling direction of the beams, structures of the image projection apparatus 10 and the light source device 12 are prevented from becoming complicated. The image projection apparatus 10 and the light source device 12 are therefore capable of preventing adhesion of contaminants to optical components such as the condenser lens 24 due to concentration of high energy while preventing the structures from becoming complicated. As a result, the image projection apparatus 10 and the light source device 12 are also capable of preventing degradation in the performance of optical components such as a decrease in the transmittance of the condenser lens 24 due to adhesion of contaminants and preventing damages such as separation and deterioration of coating of antireflective coating on the condenser lens 24 due to heat absorption of contaminants.

The first reflective film 82 and the second reflective film 84 are tilted with respect to the traveling direction of the laser beams L0 and the array direction of the three lasers 34. This allows the dispersed beams Lp dispersed from three laser beams L0 to be arranged in line.

Furthermore, since the first reflective film 82 and the second reflective film 84 are provided parallel to each other, the dispersing member 22 emits the dispersed beams Lp so that the dispersed beams Lp travel parallel to one another. This allows the image projection apparatus 10 and the light source device 12 to prevent the dispersed beams Lp from deviating from a desired traveling direction, as compared to a case in which a diffuser or the like is used to make beams travel in random directions without maintaining the peak intensities to diffuse light beams into a large area. Consequently, the image projection apparatus 10 and the light source device 12 are capable of improving the efficiency of light use.

Next, modified examples in which parameters of the dispersing member 22 described above are changed as necessary will be described. Note that, in the description of the modified examples, any of a, b, and c will be added to the reference numerals when required to distinguish from which of the laser beams L0 the dispersed beams Lp originates. For example, a reference numeral Lpa will be given to dispersed beams of a laser beam L0a, and a reference numeral Lpb will be given to dispersed beams of a laser beam L0b.

Modified Example 1

Figure 6:
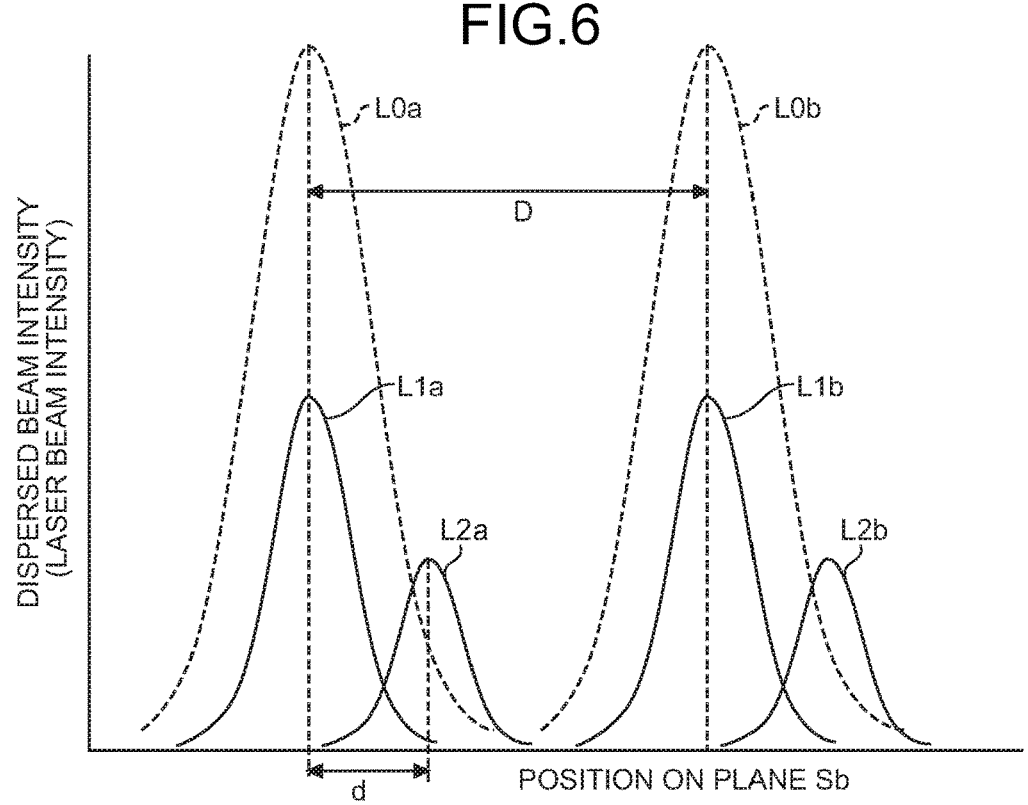
FIG. 6 is a graph of intensity distributions of dispersed beams according to a modified example 1.

FIG. 6 is a graph of intensity distributions of dispersed beams Lp according to a modified example 1. A dispersing member 22 according to the modified example 1 separates peak positions of dispersed beams Lp of a laser beam L0a from peak positions of dispersed beams Lp of a laser beam L0b adjacent to the laser beam L0a. The same applies to a laser beam L0c adjacent to the laser beam L0b. Here, as illustrated in FIG. 6, the distance between the laser beam L0a and the adjacent laser beam L0b is D. The distance D is a distance between the laser beam L0a and the laser beam L0b in a direction perpendicular to the traveling direction of the laser beam L0a. When the laser beams L0a and L0b travel parallel to each other, the distance D is also a distance between a laser 34 and a laser 34 adjacent thereto.

In the modified example 1, parameters such as the distance t, the refractive index n and the incidence angle θa are set to satisfy a condition of the following expression (6):

$$m \times d \ne D \quad m: \text{positive integer} \tag{6}$$

In the modified example 1, the dispersing member 22 is installed and structured so that the distance t, the refractive index n and the incidence angle θa calculated on the basis of the expressions (3) and (6) are satisfied. This prevents peak positions of dispersed beams Lp of adjacent laser beams L0 from overlapping with one another and prevents the peak intensities from being increased.

Modified Example 2

Figure 7:
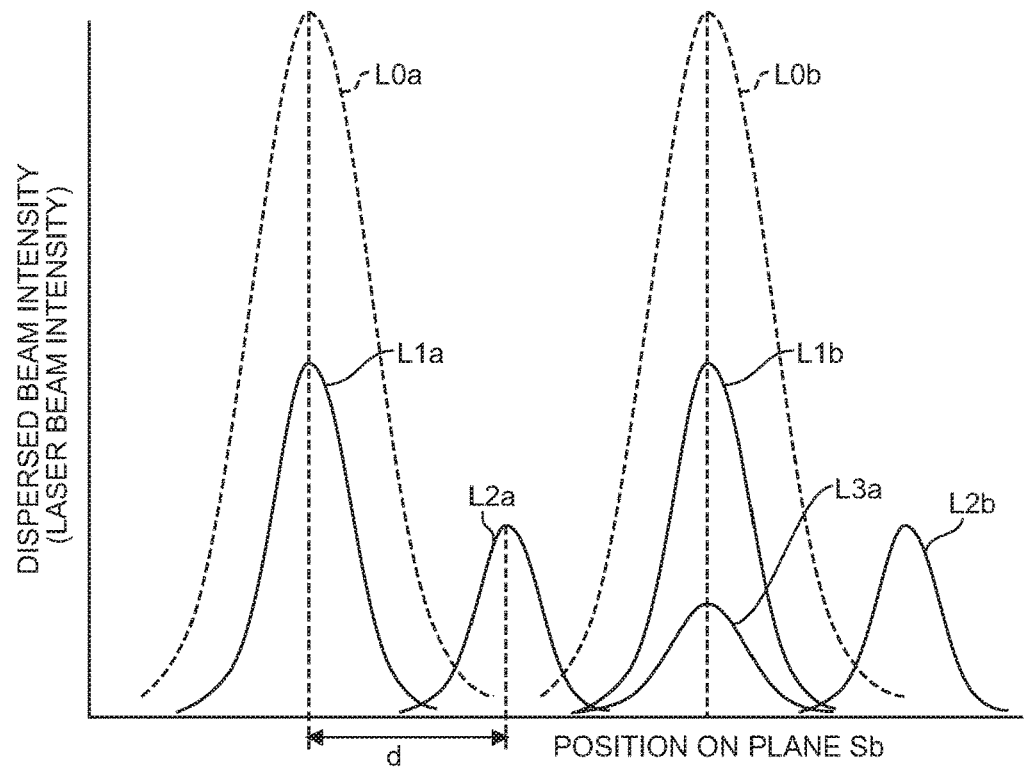
FIG. 7 is a graph of intensity distributions of dispersed beams according to a modified example 2.

FIG. 7 is a graph of intensity distributions of dispersed beams Lp according to a modified example 2. A dispersing member 22 according to the modified example 2 overlaps one of peak positions of dispersed beams Lp of a laser beam L0 with one of peak positions of dispersed beams Lp of another laser beam L0. Note that, as described above, an integration of peak intensities of adjacent dispersed beams Lp overlapped with each other is smaller than the peak intensities of the laser beam L0.

The condition under which a dispersed beam Lpa obtained by dispersion of the laser beam L0a and a dispersed beam Lpb obtained by dispersion of the laser beam L0b is as expressed by the following expression (7):

$$m \times d = D \quad m: \text{positive integer} \tag{7}$$

The dispersing member 22 is installed and structured so that the thickness t, the refractive index n and the incidence angle θa calculated on the basis of the expressions (3) and (7) are satisfied. For example, in the example illustrated in FIG. 7, the dispersing member 22 according to the modified example 2 overlaps a dispersed beam L1a obtained by dispersion of the laser beam L0a with a dispersed beam L1b obtained by dispersion of the laser beam L0b. In this case, m in the expression (7) becomes "2".

Modified Example 3

Figure 8:
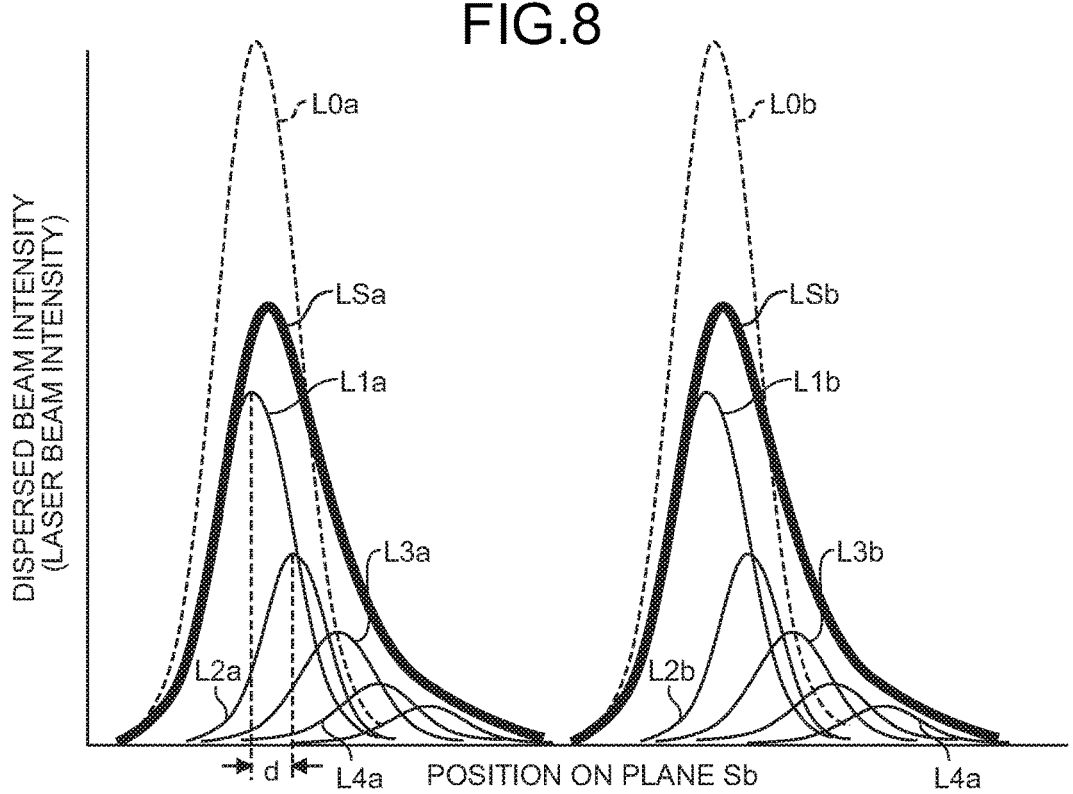
FIG. 8 is a graph of intensity distributions of dispersed beams according to a modified example 3.

FIG. 8 is a graph of intensity distributions of dispersed beams Lp according to a modified example 3. A dispersing member 22 according to the modified example 3 separates an integrated intensity distribution LS obtained by integrating intensity distributions of dispersed beams Lp of a laser beam L0 from one laser 34 from an integrated intensity distribution LS obtained by integrating intensity distributions of dispersed beams Lp of a laser beam L0 from another laser 34 adjacent to the one laser 34. In this regards, separation of the integrated intensity distributions LS refers to making the integrated intensity distributions LS not overlap with each other in regions where the intensities are 10% or more of the peak intensities thereof. In this manner, the dispersing member 22 separates the peak positions of a plurality of integrated intensity distributions LS.

For example, as illustrated in FIG. 8, the dispersing member 22 according to the modified example 3 has a distance t, a refractive index n, and an incidence angle θa for separating the integrated intensity distribution LSa obtained by integrating the intensity distributions of the dispersed beams Lpa of the laser beam L0a from the laser 34a from the integrated intensity distribution LSb obtained by integrating the intensity distributions of the dispersed beams Lpb of the laser beam L0b of the laser 34b adjacent to the laser 34a.

Modified Example 4

Figure 9:
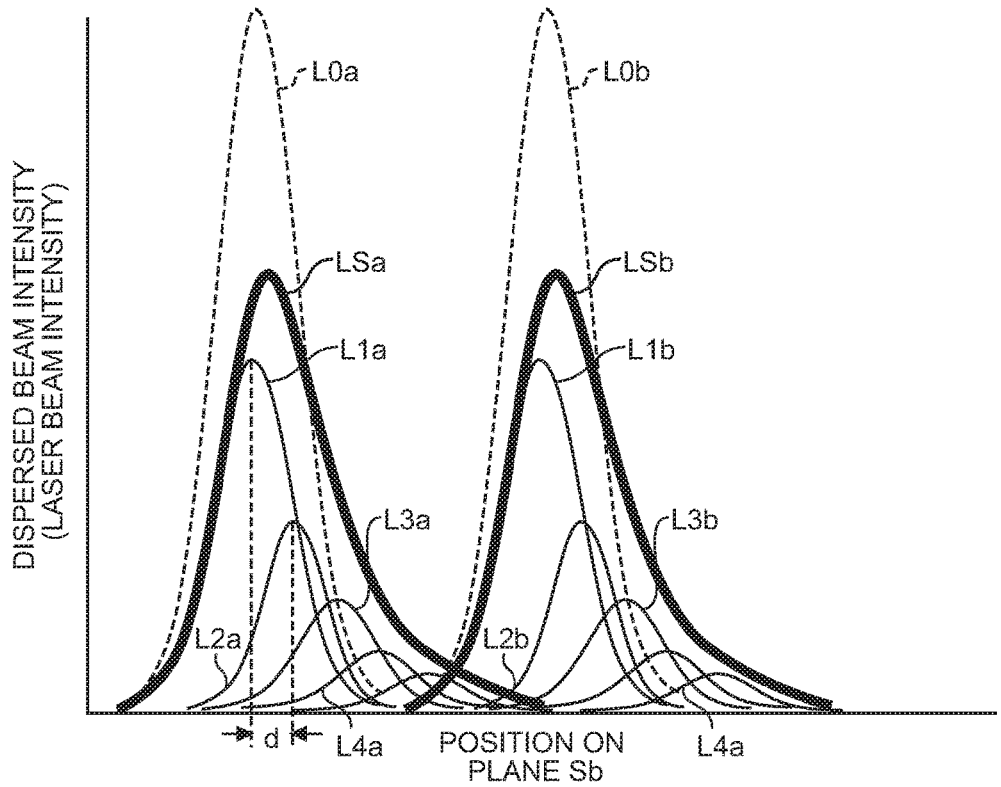
FIG. 9 is a graph of intensity distributions of dispersed beams according to a modified example 4.

FIG. 9 is a graph of intensity distributions of dispersed beams Lp according to a modified example 4. A dispersing member 22 according to the modified example 4 overlaps at least part of an integrated intensity distribution LS obtained by integrating intensity distributions of dispersed beams Lp of a laser beam L0 from one laser 34 with at least part of an integrated intensity distribution LS obtained by integrating intensity distributions of dispersed beams Lp of a laser beam L0 from another laser 34 adjacent to the one laser 34. In this regards, overlapping of the integrated intensity distributions LS with each other refers to overlapping of at least parts of the integrated intensity distributions LS with each other in regions where the intensities are 10% or more of the peak intensities thereof. Note that it is preferable that the dispersing member 22 separates the peak positions of a plurality of integrated intensity distributions LS.

As illustrated in FIG. 9, the dispersing member 22 according to the modified example 4 has a distance t, a refractive index n, and an incidence angle θa for overlapping at least part of the integrated intensity distribution LSa obtained by integrating the intensity distributions of the dispersed beams Lpa of the laser beam L0a from the laser 34a with at least part of the integrated intensity distribution LSb obtained by integrating the intensity distributions of the dispersed beams Lpb of the laser beam L0b from the laser 34b adjacent to the laser 34a.

Modified Example 5

Figure 10:
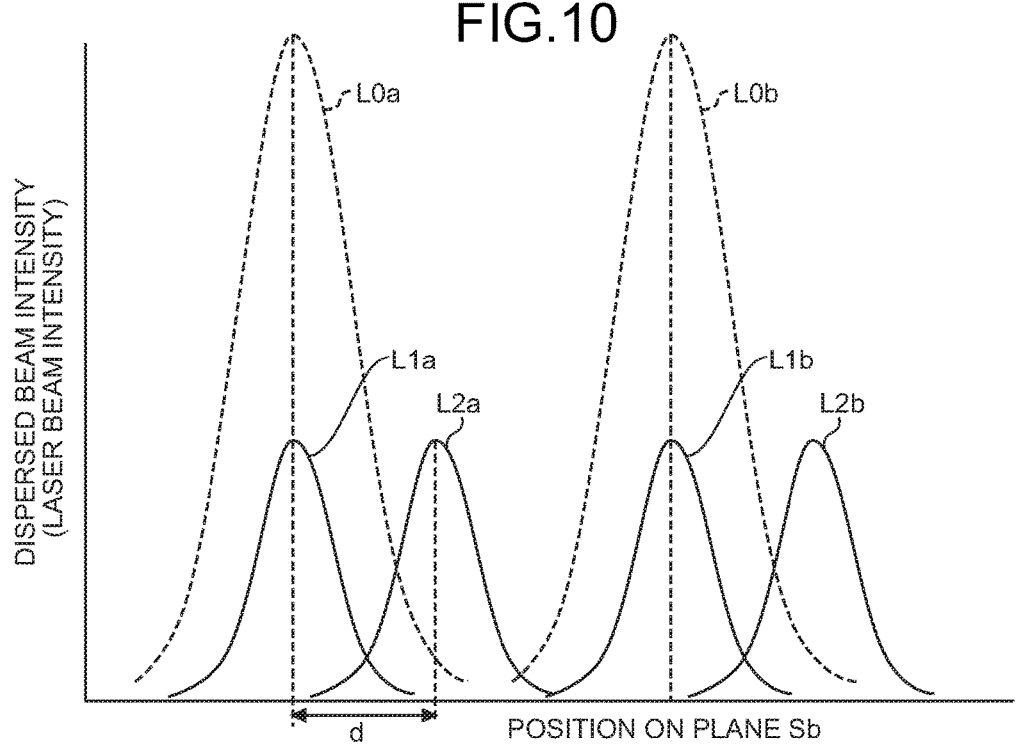
FIG. 10 is a graph of intensity distributions of dispersed beams according to a modified example 5.

FIG. 10 is a graph of intensity distributions of dispersed beams Lp according to a modified example 5. As illustrated in FIG. 10, a dispersing member 22 according to the modified example 5 makes the peak intensity of a dispersed beam L1, which has been reflected by the surface of the first reflective film 82 on the side of incidence of the laser beams L0, and the peak intensity of a dispersed beams L2, which has been transmitted by the first reflective film 82, reflected by the second reflective film 84, and then transmitted by the first reflective film 82, equal to each other. In this case, the following expression (8) is satisfied:

$$R_1 = T_1^2 R_2 \quad (8)$$

When $R_2$ is 1, given that $R_1 + T_1 = 1$, the value of $R_1$ for making the peak intensity of the dispersed beam L1 and the peak intensity of the dispersed beam L2 equal to each other is as follows:

$$R_1 = (3 \pm 5^{1/2})/2$$

Modified Example 6

Figure 11:
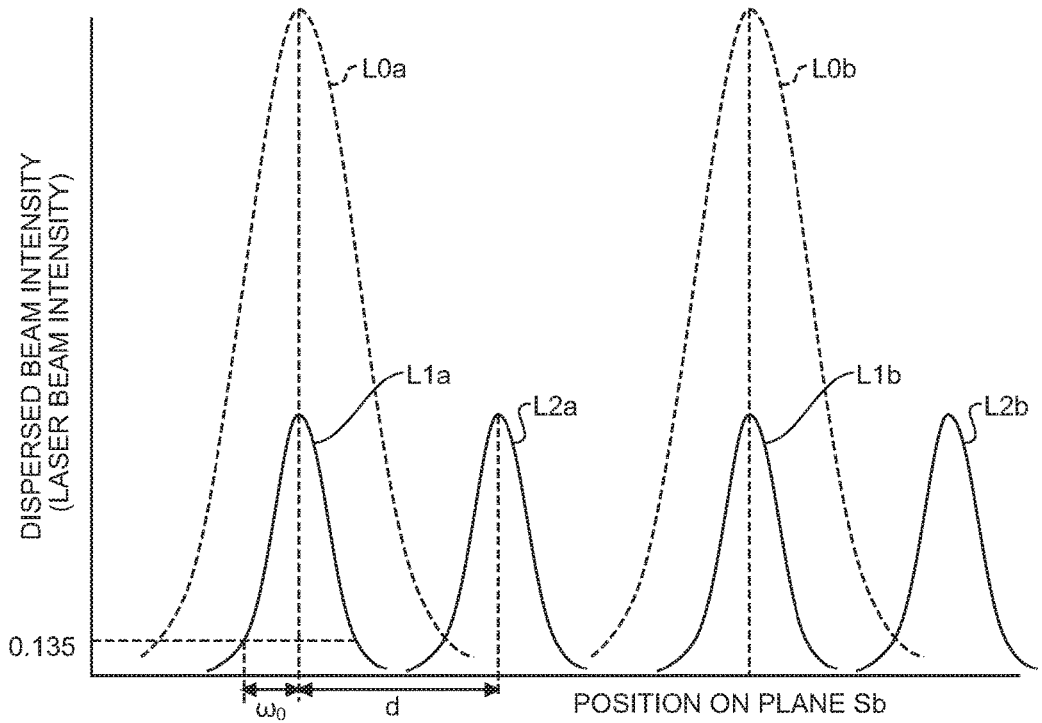
FIG. 11 is a graph of intensity distributions of dispersed beams according to a modified example 6.

FIG. 11 is a graph of intensity distributions of dispersed beams Lp according to a modified example 6. As illustrated in FIG. 11, a dispersing member 22 according to the modified example 6 has a distance t, a refractive index n, and a incidence angle θa for separating the intensity distribution of a dispersed beam L1, which has been reflected by the surface of the first reflective film 82 on the side of incidence of the laser beams L0, from the intensity distribution of a dispersed beam L2, which has been transmitted by the first reflective film 82, reflected by the second reflective film 84, and then transmitted by the first reflective film 82. In this regards, separation of the intensity distributions refers to making the intensity distributions not overlap with each other in regions within the Gaussian beam radius $\omega_0$ thereof.

The structures in the embodiment and the modified examples described above may be modified as necessary. Furthermore, relative positions in the structures in the embodiment and the modified examples may be modified.

For example, although an example of two reflective films has been presented in the embodiment described above, three or more reflective films may be provided. In this case, a reflective film provided closest to the side of incidence of the laser beams and other reflective film provided between films have transmittance of other than zero.

The dispersing member 22 may be constituted by a diffraction grating or the like capable of dispersing a laser beam into a plurality of dispersed beams each of which has a peak intensity.

Although an example of the light source 20 including three lasers 34 has been presented in the above-described embodiment, the light source is not limited thereto. For example, the light source 20 may include one or a plurality of lasers 34.

Figure 12:
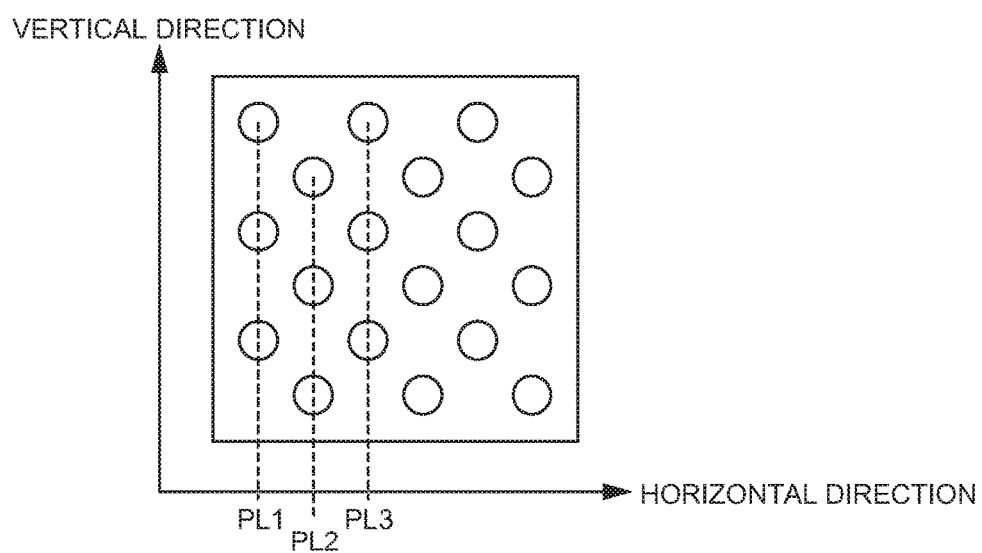
FIG. 12 is a front view for explaining another array of lasers of a light source.

Although an example of the light source 20 including the lasers 34 arranged in line has been presented in the above-described embodiment, the light source is not limited thereto. FIG. 12 is a front view for explaining another array of lasers 34 of a light source 120. For example, when the light source 120 includes 18 lasers 34, the lasers 34 may be arranged in a matrix as illustrated in FIG. 12. Note that horizontal positions PL1 and PL3 of lasers 34 on one row are preferably different from a horizontal position PL2 of a laser 34 on another row adjacent thereto in the vertical direction as illustrated in FIG. 12. More preferably, the position PL2 is a middle point between the position PL1 and the position PL3. Consequently, the intensity distributions of the dispersed beams Lp are further prevented from overlapping with each other.

When the laser beam L0 from the lasers 34 has an oval shape on a plane perpendicular to the traveling direction, the dispersing member 22 preferably disperse the laser beam L0 along the minor axis direction of the laser beams L0 into dispersed beams Lp. This allows the dispersing member 22 to separate the dispersed beams Lp from one another even when the intervals between adjacent dispersed beams Lp are small.

The reflectances $R_1$ and $R_2$ and the transmittances $T_1$ and $T_2$ of the first reflective film 82 and the second reflective film 84 may be changed as necessary depending on the wavelengths and polarization directions of the laser beams L0.

The first reflective film 82 and the second reflective film 84 may be provided on separate supports.

A light source device according to the present disclosure reduces adhesion of contaminants by a dispersing member that emits laser beams in the form of dispersed beams, which produces an effect of preventing an increase in size of the light source device.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device comprising:
   a light source including multiple lasers;
   a dispersing member disposed on a path of laser beams emitted by the multiple lasers, and configured to disperse each of the laser beams into a plurality of dispersed beams with peak intensities lower than a peak intensity of each of the laser beams to emit the dispersed beams, the laser beams from the multiple lasers being incident in parallel on the dispersing member;
   an optical component disposed on paths of the dispersed beams and collecting the dispersed beams; and
   a diffuser configured to rotate about a rotation axis parallel to paths of the collected beams by the optical component and to diffuse the collected beams.

2. The light source device according to claim 1, wherein the dispersing member includes:

a first reflective film configured to transmit part of each of the laser beams incident thereon; and a second reflective film placed with a distance from the first reflective film, having a transmittance lower than a transmittance of the first reflective film, and configured to reflect the laser beam transmitted by the first reflective film.

3. The light source device according to claim 2, wherein peak positions of the laser beams emitted by the multiple lasers do not overlap with one another at the first reflective film.

4. The light source device according to claim 2, wherein the multiple lasers are arranged in an array, and one plane including the first reflective film and another plane including the second reflective film are tilted with respect to a traveling direction of the laser beams and a direction of the array, and are parallel to each other.

5. The light source device according to claim 1, wherein the dispersing member separates peak positions of intensities of the dispersed beams obtained by dispersing the laser beam from one of the multiple lasers from peak positions of intensities of the dispersed beams obtained by dispersing the laser beam from another laser adjacent to the one of the multiple lasers.

6. The light source device according to claim 1, wherein the dispersing member overlaps one of peak positions of intensities of the dispersed beams obtained by dispersing the laser beam from one of the multiple lasers with one of peak positions of intensities of the dispersed beams obtained by dispersing the laser beam from another laser adjacent to the one of the multiple lasers.

7. The light source device according to claim 1, wherein the dispersing member separates an integrated intensity distribution obtained by integrating intensity distributions of the dispersed beams of the laser beam from one of the multiple lasers from an integrated intensity distribution obtained by integrating intensity distributions of the dispersed beams of the laser beam from another laser adjacent to the one of the multiple lasers.

8. The light source device according to claim 1, wherein the dispersing member overlaps at least part of an integrated intensity distribution obtained by integrating intensity distributions of the dispersed beams of the laser beam from one of the multiple lasers with at least part of an integrated intensity distribution obtained by integrating intensity distributions of the dispersed beams of the laser beam from another laser adjacent to the one of the multiple lasers.

9. The light source device according to claim 2, wherein the dispersing member makes a peak intensity of a first dispersed beams having been reflected by a surface of the first reflective film on a side of incidence of the laser beams and a peak intensity of a second dispersed beams having been transmitted by the first reflective film, reflected by the second reflective film, and further transmitted by the first reflective film equal to each other.

10. The light source device according to claim 2, wherein the dispersing member separates an intensity distribution of a first dispersed beams having been reflected by a surface of the first reflective film on a side of incidence of the laser beams from an intensity distribution of a second dispersed beams having been transmitted by the first reflective film, reflected by the second reflective film, and further transmitted by the first reflective film.

11. The light source device according to claim 2, wherein the dispersing member separates a peak position of an integrated intensity distribution obtained by integrating intensity distributions of the dispersed beams of a laser beam from one of the multiple lasers from a peak position of an integrated intensity distribution obtained by integrating intensity distributions of the dispersed beams of a laser beam from another laser adjacent to the one of the multiple lasers.

12. An image projection apparatus comprising:

the light source device according to claim 1; and an image generation unit configured to generate an image by light from the light source.

* * * * *